United States Patent
Raper, Jr. et al.

(10) Patent No.: US 9,834,421 B2
(45) Date of Patent: Dec. 5, 2017

(54) SYSTEM, APPARATUS, AND METHOD FOR THE TRANSPORT AND POSITIONING OF A DISPLAY

(71) Applicants: Ronald E. Raper, Jr., Prairie Grove, AR (US); James T. Probus, Jr., Austin, AR (US); Joshua C. Jackson, Omaha, NE (US)

(72) Inventors: Ronald E. Raper, Jr., Prairie Grove, AR (US); James T. Probus, Jr., Austin, AR (US); Joshua C. Jackson, Omaha, NE (US)

( * ) Notice: Subject to any disclaimer, the term of this patent is extended or adjusted under 35 U.S.C. 154(b) by 138 days.

(21) Appl. No.: 14/543,548

(22) Filed: Nov. 17, 2014

(65) Prior Publication Data
US 2015/0246681 A1   Sep. 3, 2015

Related U.S. Application Data

(60) Provisional application No. 61/904,770, filed on Nov. 15, 2013.

(51) Int. Cl.
*B62B 1/10* (2006.01)
*B62B 3/10* (2006.01)
(Continued)

(52) U.S. Cl.
CPC ............... *B66F 5/02* (2013.01); *B62B 1/008* (2013.01); *B62B 2203/10* (2013.01); *B62B 2203/11* (2013.01)

(58) Field of Classification Search
CPC ........... B25B 5/142; B66B 9/16; B62B 1/008; B62B 2203/10; B62B 2203/11;
(Continued)

(56) References Cited

U.S. PATENT DOCUMENTS 1,345,881 A * 7/1920 Purnell ................... B66C 23/48
254/338
1,650,810 A * 11/1927 Weaver ..................... B66F 5/02
254/133 R
(Continued)

FOREIGN PATENT DOCUMENTS

DE          2917839 A1 * 11/1980 ............. B66C 23/48
DE         10116256 A1 *  9/2002 ............. B66C 23/48
NZ  WO 2010123384 A1 * 10/2010 ............. B25B 11/02

*Primary Examiner* — Joseph J Hail
*Assistant Examiner* — Arman Milanian
(74) *Attorney, Agent, or Firm* — Debra K. Winters (57) ABSTRACT

The present disclosure is directed to device to lift, maneuver, hoist, and install an item such as a flat screen TV, cabinet, mirror, window, on the wall, such installation that would normally require more than one person. The present disclosure relates generally to a device that can lift large bulky heavy items in both vertical and horizontal directions for installing, mounting, and placing on the wall. This is accomplished by smooth and precise horizontal and vertical motion that is controlled by the operator. Manpower has been the common device of choice in many of these instances, and this invention will succeed in the cases that include handling bulky, large, cumbersome items or general items in congested or hard-to-reach places that would typically require more than one person to perform the lifting, installing, mounting, or moving.

7 Claims, 9 Drawing Sheets

(51) Int. Cl.
*B66F 5/02* (2006.01)
*B62B 1/00* (2006.01)

(58) Field of Classification Search
CPC ... B66C 23/48; B66C 1/10; B66F 5/02; B66F 9/20; B66F 9/18; B66F 9/08; B66F 7/00; B66F 3/14; B66D 3/06; B66D 3/04
USPC ........ 414/12, 11, 10; 269/17; 254/2 B, 10 R, 254/10 B, 124, 134; 248/295.11, 296.1, 248/297.11, 297.21, 276.1, 284.1, 286.1, 248/287.1
See application file for complete search history.

(56) References Cited

U.S. PATENT DOCUMENTS

| | | | | |
|---|---|---|---|---|
| 1,699,587 | A * | 1/1929 | Grenier | B66C 23/48 212/168 |
| 2,419,813 | A * | 4/1947 | Berchtold | B66C 23/48 187/237 |
| 2,615,584 | A * | 10/1952 | Adams | B66C 23/48 212/180 |
| 2,785,817 | A * | 3/1957 | Pappathatos | B66C 23/48 187/232 |
| 2,804,979 | A * | 9/1957 | Lassiter | B66C 23/48 212/202 |
| 3,028,978 | A * | 4/1962 | Dickens | B66C 23/48 254/376 |
| 3,337,187 | A * | 8/1967 | Sumner | B66C 23/48 254/387 |
| 3,957,137 | A * | 5/1976 | Vermette | B66B 9/16 187/222 |
| 4,021,017 | A * | 5/1977 | Adams | B66C 23/48 254/124 |
| 4,023,686 | A | 5/1977 | Papsco et al. | |
| 4,088,303 | A | 5/1978 | Aquila | |
| 4,118,010 | A * | 10/1978 | Hanscom | B66C 23/48 254/124 |
| 4,278,244 | A | 7/1981 | Carter | |
| 4,334,668 | A * | 6/1982 | Caris | B66C 23/48 254/8 B |
| 4,616,225 | A * | 10/1986 | Woudenberg | G08G 1/0955 116/63 P |
| 4,669,703 | A * | 6/1987 | Hawkins | B66C 23/48 254/124 |
| 4,925,039 | A * | 5/1990 | Macris | B66C 23/48 212/261 |
| 4,934,659 | A | 6/1990 | Yoke | |
| 4,951,944 | A * | 8/1990 | Morgan | A63B 63/083 473/483 |
| 4,978,132 | A | 12/1990 | Wilson | |
| 4,987,976 | A * | 1/1991 | Daugherty | B66B 9/16 16/331 |
| 5,164,011 | A * | 11/1992 | Ray | B05B 13/0285 118/500 |
| 5,375,963 | A * | 12/1994 | Wohlwend | B66C 23/48 212/203 |
| 5,400,019 | A * | 3/1995 | Riscoe, Jr. | G08G 1/0955 116/63 P |
| 6,202,868 | B1 * | 3/2001 | Murray | A22B 5/06 212/227 |
| 6,530,740 | B2 | 3/2003 | Kim | |
| 6,929,443 | B1 | 8/2005 | Nellis | |
| 7,683,564 | B2 | 3/2010 | Harris et al. | |
| 8,083,458 | B2 | 12/2011 | Wilkie | |
| 8,192,134 | B2 | 6/2012 | Brewer, III | |
| 8,210,912 | B2 * | 7/2012 | Ugiansky | A22B 5/06 452/187 |
| 2002/0100851 | A1 * | 8/2002 | Abramowsky | F16M 11/04 248/284.1 |
| 2003/0071003 | A1 * | 4/2003 | Eaton | B66C 23/48 212/199 |
| 2011/0243696 | A1 | 10/2011 | DiBenedetto | |
| 2013/0037768 | A1 * | 2/2013 | Hayes | B66C 23/48 254/327 |
| 2014/0068855 | A1 * | 3/2014 | Grow | A61G 7/1017 5/87.1 |

* cited by examiner

SYSTEM, APPARATUS, AND METHOD FOR THE TRANSPORT AND POSITIONING OF A DISPLAY

CROSS-REFERENCE TO RELATED APPLICATIONS

This applications claims priority to U.S. Provisional Patent Application Ser. No. 61/904,770, filed Nov. 15, 2013, which is hereby incorporated by reference in its entirety.

BACKGROUND OF THE INVENTION

The present disclosure details a system, method and apparatus for the vertical and horizontal lifting of an item, such as a, televisions, mirrors, cabinets, windows, doors, panes of glass, ceiling fixtures, ceiling fans, auto parts, marine parts, sheetrock, projectors, banners, and signs, etc.

BRIEF SUMMARY OF THE INVENTION

The subject matter of the present disclosure is directed to an apparatus for lifting, maneuvering, hoisting, and installing heavy, bulky, and/or cumbersome items such as a flat screen TV, cabinet, mirror, or window onto a surface such as a wall or ceiling. An embodiment of the apparatus may be used to assist in the moving and installation of items.

The subject matter described herein includes a system, apparatus and method capable of filling the gap between very small, inexpensive, material handling devices and larger, expensive, much higher-capacity material handling devices, both which exist in the market today. Manpower has been the common device of choice in many of these instances, and the teachings included herein will succeed in cases that include handling bulky, large, cumbersome items or handling general items in congested or hard-to-reach places that currently would typically require more than one person to accomplish.

The features of novelty and various other advantages that characterise the present disclosure are pointed out with particularity in the claims portion of this document. However, for a better understanding of the present disclosure, its advantages, and the objectives obtained by its use, reference should foe made to the included figures, and to their accompanying descriptive matter. The features and advantages of the present disclosure will be apparent to one skilled in the art. While numerous changes may be made by those skilled in the art, such changes are within the spirit of the present disclosure.

Embodiments of the present disclosure may include an apparatus for positioning a display or other object at an elevated height, relative to a first position. Changes in height are facilitated by a telescopic connection that extends a frame.

Embodiments of the present disclosure may include a pivotable boom, which by means of a transitory connection, is able to traverse a base frame to raise a display to a selectable height.

Embodiments of the present disclosure may include a pivotable boom, which is able to be pivoted out from a vertical support structure to raise a display to a selectable height.

Embodiments of the present disclosure may include a wheel system for facilitating transportation of the device.

Embodiments of the present disclosure may include a pivotable boom capable of pivoting laterally.

Embodiments of the present disclosure may include a rotational connection between at least some of the components to enable a deployed position suitable for the transportation and placement of a display at an elevated height, and an un-deployed position suitable for transport and storage of the apparatus.

Embodiments of the present disclosure may include horizontal bracing members, which are adjustable between a deployed configuration and an un-deployed configuration. Further embodiments may include one or more connection points between the horizontal bracing members and the base frame.

Embodiments of the present disclosure may include a vertical frame, which can comprise one or more subparts, the addition or subtraction thereof alters the vertical height of the frame.

The subject of the present disclosure can be used to help install, mount, move, lift, raise, lower, remove, replace, relocate, rotate, tilt, and store items such as, but not limited to: televisions, mirrors, cabinets, windows, doors, panes of glass, ceiling fixtures, ceiling fans, auto parts, marine parts, sheetrock, projectors, banners, and signs and can do it easily with the assistance of a single operator. Additionally, general pallet handling in and out of a vehicle, general pallet handling in a warehouse, as well as handling of lighter and/or smaller items that would typically be handled by a forklift in a warehouse are also items and scenarios for the use of the subject matter of the present disclosure. This list of items for which the subject matter contained herein could be used is not intended to be exhaustive, but is instead merely representative of potential applications exemplifying the need for such a device, as will be apparent to one skilled in the art.

BRIEF DESCRIPTION OF THE DRAWINGS

The novel features believed characteristic of the disclosed subject matter will be set forth in any claims that are filed later. The disclosed subject matter itself, however, as well as a preferred mode of use, further objectives, and advantages thereof, will best be understood by reference to the following detailed description of an illustrative embodiment when read in conjunction with the accompanying figures, wherein:

These and other aspects of the present disclosure will become more readily apparent to those having ordinary skill in the art from the following detailed description of the present disclosure taken in conjunction with the figures.

DETAILED DESCRIPTION OF ILLUSTRATIVE EMBODIMENTS

Reference now should be made to the figures, in which the same reference numbers are used throughout the different figures to designate the same components.

Disclosed herein are more detailed descriptions of specific embodiments of the apparatus of the present disclosure. It will be understood that the disclosed embodiments are merely examples of ways in which certain aspects of the present disclosure can foe implemented and are not intended to be limiting. The figures are not necessarily to scale and some features may be exaggerated, minimized, or absent in order to show details of particular components. Well-known components, materials, or methods are not necessarily described in great detail so as to avoid obscuring the present disclosure.

Figures illustrating the components show some elements that are known and will be recognized by one skilled in the art. The detailed descriptions of such elements are not necessary to establish an understanding of the present disclosure, and accordingly, are presented only to the degree necessary to facilitate an understanding of the novel features of the present disclosure to one having skill in the art.

Figure 1:
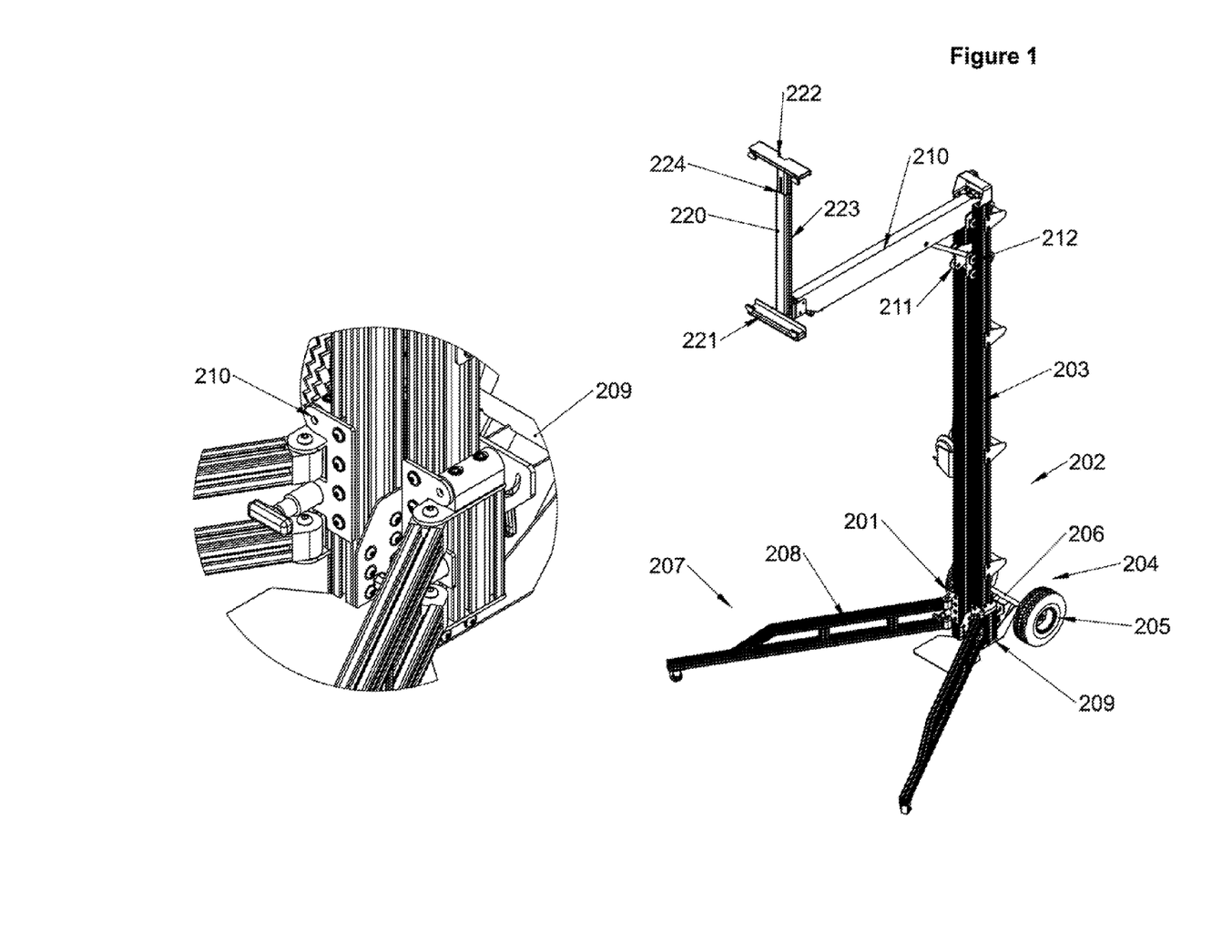
FIG. 1 illustrates an exemplary embodiment of the present disclosure in the deployed position with the lift assembly in a completely vertical configuration and the attachment bracket in its uppermost open position.

FIG. 1 depicts a simplified embodiment of the apparatus 100 described in the present disclosure. As shown, the embodiment presented includes a pivoting boom 210 that may pivot from a lowered, essentially vertical position to a raised, essentially horizontal position to achieve smooth and precise vertical and horizontal movement of the payload. As shown, the embodiment presented also includes a base frame 202, which in the embodiment presented is similar in arrangement to a two-wheeled dolly. Embodiments of the present disclosure enable users to center the item that is to be moved or installed (e.g. television display, monitor, etc.) in an adjustable clamp 220. The apparatus is able to swing the item through a 90° arc. The apparatus supporting mechanisms are returned to an un-deployed position. The apparatus positioned in a second position where the item is intended to be mounted or installed.

The exemplary base frame 202 arrangement presented in FIG. 1 may comprise vertical support tracks 203 for facilitating the movement of the boom 210. As shown, the exemplary boom arrangement allows for both vertical movement up the tracks of the base frame as well as horizontal extension of the boom from the base frame for transporting and placing the adjustable clamp 220, which attaches to the payload and allows it to be lifted and mounted in the precise display position.

The base frame 202 of the apparatus may comprise a wheel configuration 204 for facilitating the movement of the apparatus 100 between positions. In the embodiment presented, the wheel configuration comprises two wheels 205 each connected by an axle 206 to the base frame 202. Alternative embodiments may employ a fewer or a greater number of wheels, and likewise, wheels may be connected by a single axle, an axle for each wheel, or a combination thereof.

As shown in FIG. 1, the base frame 202 may be connected to one or more horizontal bracing members 207, or outriggers 208. As depicted, these horizontal bracing members 207 engage with a floor, or other supporting surface, and prevent the forward tilting or overturning of the apparatus 100.

Figure 4:
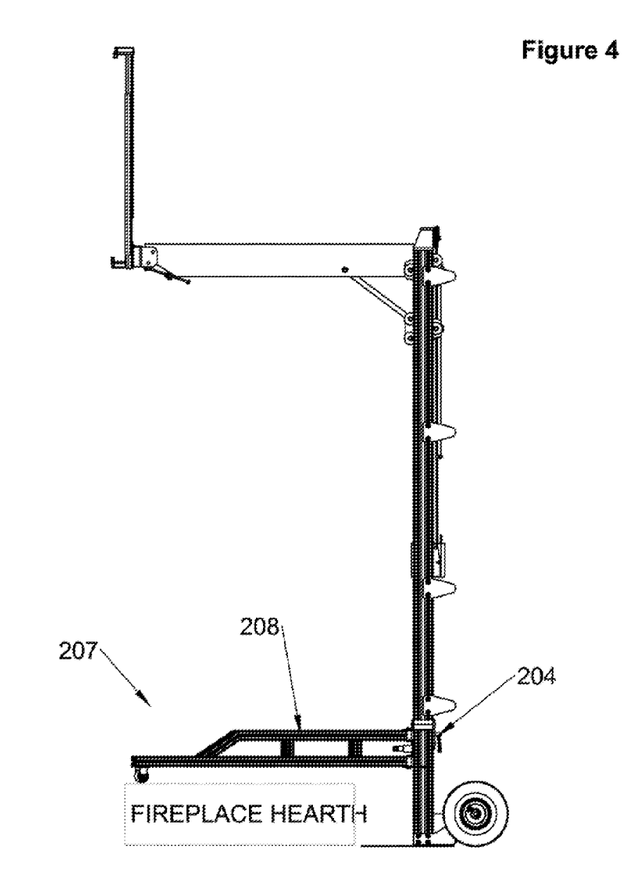
FIG. 4 illustrates an exemplary base frame arrangement which may include multiple positions for affixing the horizontal bracing members.

In some embodiments, the base frame 202 may be configured with one or more positions for affixing the horizontal bracing members 209, whereby the height at which the horizontal bracing members 209 sit relative to the floor level and apparatus 100 may be altered. FIG. 4 depicts one arrangement by which the present disclosure accomplishes this. In alternative embodiments, the apparatus 100 may be configured with only one position for affixing the horizontal bracing members 209.

In some embodiments, the horizontal bracing members 209 may be transitional between a deployed position, whereby the horizontal bracing members 209 are essentially perpendicular and splayed, from base frame 202, and an un-deployed position that facilitates ease of transport of the apparatus 100. In other embodiments, the apparatus may include no horizontal bracing members. In yet other embodiments, the apparatus may include fixed, or essentially fixed, horizontal bracing members.

Figure 2:
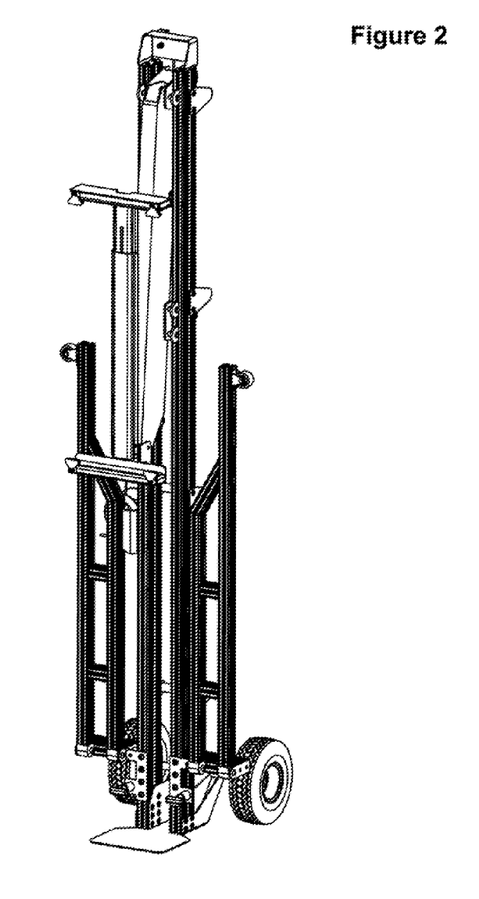
FIG. 2 illustrates an exemplary embodiment of the present disclosure in the un-deployed or folded position.

In the embodiment presented in FIG. 2, the apparatus 100 is in the un-deployed position, whereby the horizontal bracing members 209 are pivoted to align parallel to the direction of the base frame/vertical tracks 202/203. In further embodiments, the un-deployed position of the horizontal bracing members 209 may involve the removal of these elements from the apparatus body.

In contrasting embodiment, the apparatus 100 may comprise a fixed supporting element 201 connected to the base frame 202, as per the arrangement depicted in FIG. 1.

The embodiment shown in FIG. 1 may further comprise vertical support tracks 203, which in the embodiment presented, are connected to the base frame 202. The roller connection 212 between the boom assembly 211 and the vertical support tracks 203 provides one means by which the apparatus imparts a change in vertical/horizontal placement to a display, etc. In the embodiment presented, the toiler connection between the boom assembly 211 and the vertical support tracks 203 includes a lift pulley system, which can be actuated either manually using a crank handle, or can be fitted to an electrical drill.

A further feature of the embodiment shown in FIG. 1 is the pivotable boom 210, which may be connected to the vertical support tracks 203 by the boom assembly 211. In the embodiment presented, the pivotable boom 210 has freedom of movement in a vertical direction, e.g. up and down. Further embodiments may also have lateral movement relative to the base frame for facilitating the precise placement of the display without the requirement of altering the position of the entire apparatus. An exemplary apparatus displaying this functionality is presented in FIG. 3.

Embodiments of the present disclosure may also be fitted with an adjustable clamp 220, as per the arrangement presented, in FIG. 1. As shown, one embodiment of the adjustable clamp includes two flanges 222 connected by a telescopic element 224, wherein the telescopic element modifies the distance between the two flanges thereby allowing the clamp to be fitted to displays of various dimensions. Further embodiments of the adjustable clamp include a rubber or soft fitting 221 on the underside, or interior side, of the flanges to prevent damage to the display.

In one embodiment, the change in distance between the two flanges may be managed, by simply loosening nut(s) 223, manually telescoping the needed distance and then tightening them down to ensure security. Other means for adjustment can be used such as a locking pin assembly. Other embodiments will lock the telescopic pieces in the correct position using other means.

Figure 3:
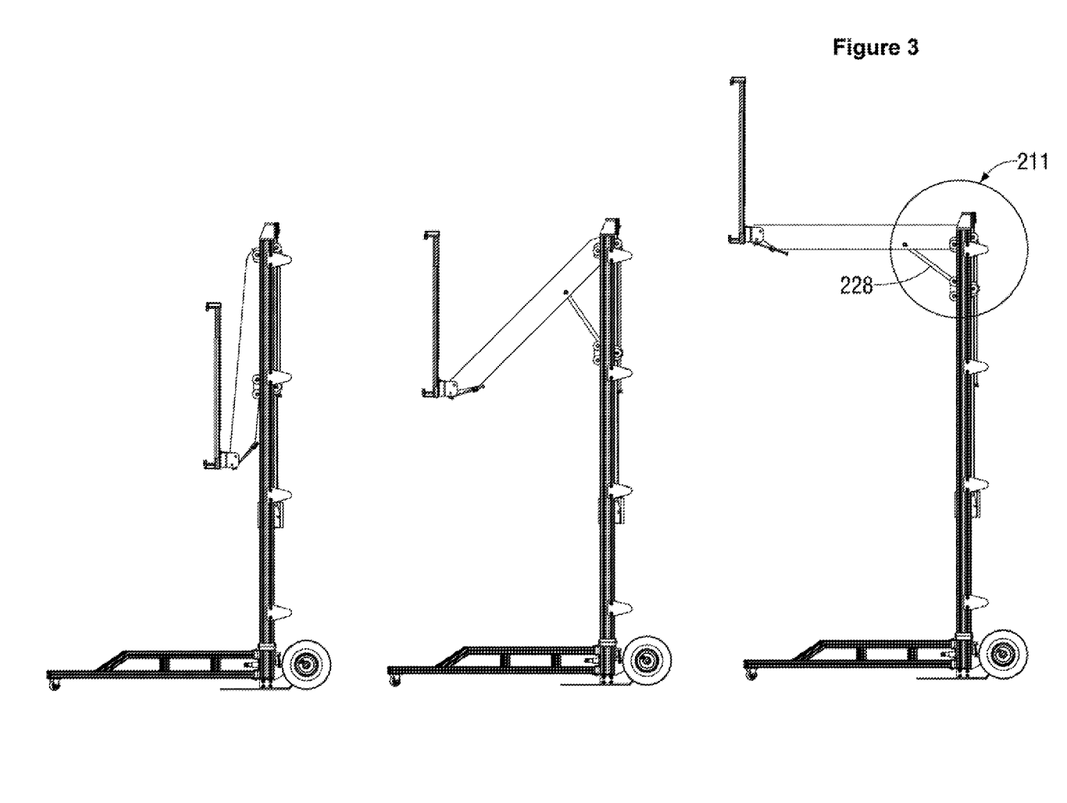
FIG. 3 illustrates different views of an exemplary embodiment for the present disclosure and shows a representation of the motion described in detail for a preferred embodiment.
Figure 5:
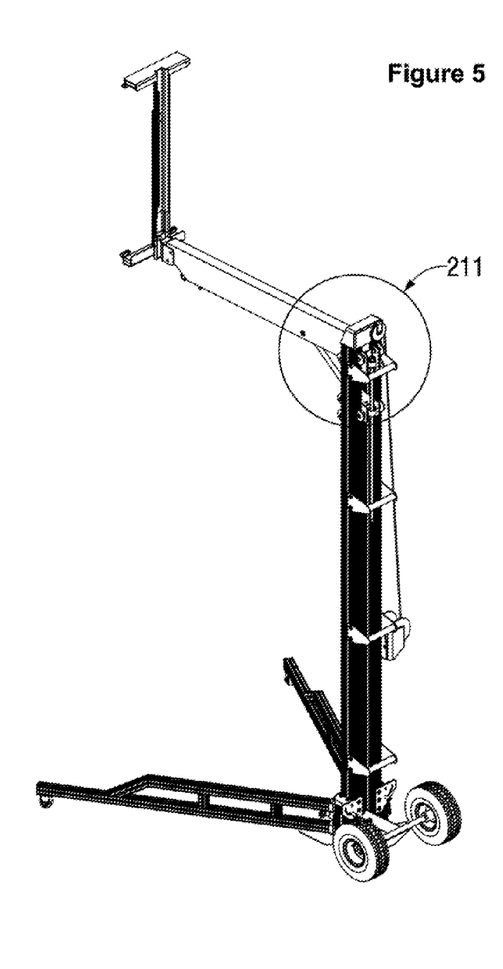
FIG. 5 and FIG. 6 present an exemplary boom arrangement of the present disclosure and the operation thereof.
Figure 6:
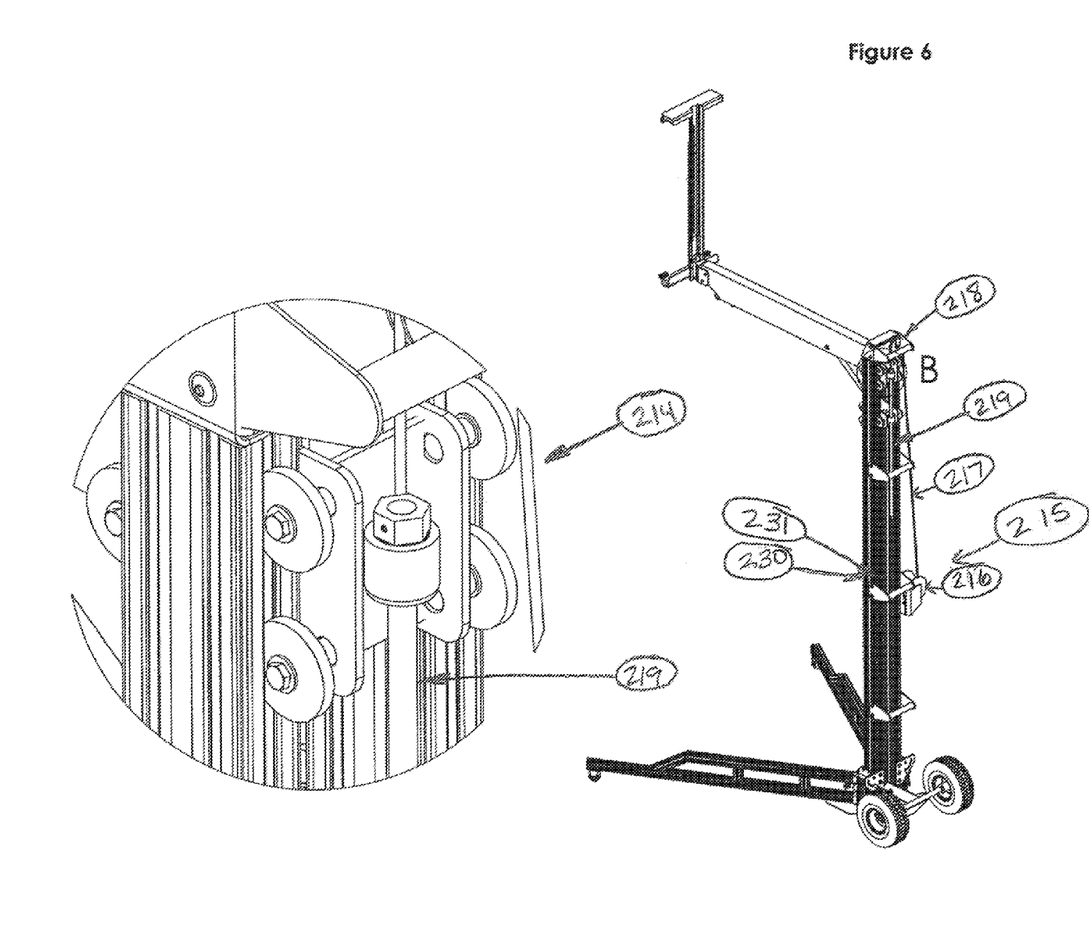

A further feature presented in FIG. 3, is the means by which the pivotable boom 210 may be pivoted outwards from the vertical support tracks 203. As shown, the pivotable boom 210 may be connected to the vertical support tracks 203 using the roller connections 212 of the boom assembly 211 at two locations. Other arrangements encompassed by the present disclosure may have a greater or a fewer number of connections. FIG. 5 and FIG. 6 show how the roller connections 212 that connect the boom assembly 211 to the vertical support tracks may include roller brackets 213/214. The embodiment presented includes two roller brackets 213/214, with the present disclosure including embodiments with a greater and a fewer number of roller brackets 213/214. In the arrangement shown, the two roller brackets 213/214 may move vertically up/down the vertical support tracks 203 to enable both the vertical and horizontal movement of the boom arm.

The vertical movement of the boom 210 and the horizontal extension may be controlled in two different ways. The vertical movement of the boom 210 is driven by the winch and pulley system 215. The winch and pulley system 215 may be mounted on the side of the vertical support tracks 203 and made up of a winch 216, wire rope 217, and a mounted pulley 218. The winch and pulley system 215 may be connected to the top roller bracket 214. By turning the winch 216 (either manually or by using a powered drill), the boom arm 228, boom assembly 211, and roller brackets 213/214 move vertically up and down the vertical support tracks 203. The horizontal extension of the boom arm 228 may be driven by a threaded bar 219 that connects the two roller brackets 213/214 together. By turning the thread bar 219 (either manually or by using a powered drill) the distance between the two roller brackets 213/214 may be changed. This movement causes the boom 210 to extend or retract horizontally. FIG. 5 and FIG. 6 also shows the two roller brackets 213/214 are connected to each other by a threaded bar 219. Further embodiments may include a telescopic boom arm 228, thereby allowing the pivotable boom 210 to be raised beyond a perpendicular position relative to the base frame.

FIG. 4 illustrates an exemplary base frame 202 arrangement. As shown, some embodiments of the present disclosure may include base frames configured with one or more positions for affixing the horizontal bracing members 209, whereby the height at which the horizontal bracing members 209 sit relative to the floor level and apparatus 100 may be altered.

Some embodiments of the present disclosure include connections between the components that are hinge or pivotable connections. These pivotable connections enable the apparatus to transition between a deployed position 200, as per that shown in FIG. 1, or an undeployed position 110, as per the embodiment shown in FIG. 2. Exemplary connections for the apparatus to facilitate this functionality are presented in FIG. 3, and FIGS. 5 through 6.

An embodiment may make use of a powered drill to provide the propulsion or torque for the drive mechanism, thus eliminating costly drive engines or motor. In exemplary embodiments, items are lifted straight vertically and then straight horizontally or can be lifted horizontally and then vertically. In further exemplary embodiments, items are lifted side to side or by rotational motions.

One embodiment has two potential ways to lift the item; the first way is a manual ratchet handle 230 that can be cranked; and the second way is by a chuck drive 231 to which the installer can hook a standard battery-powered screw gun. The drive system 215 utilizes a protected piece of ail-thread 219 to ensure minor adjustments can be made. This feature allows the installer to mount items up and over monuments such as fireplaces, cabinets, bars, furniture, or other structures that extend horizontally from the wall.

Figure 7:
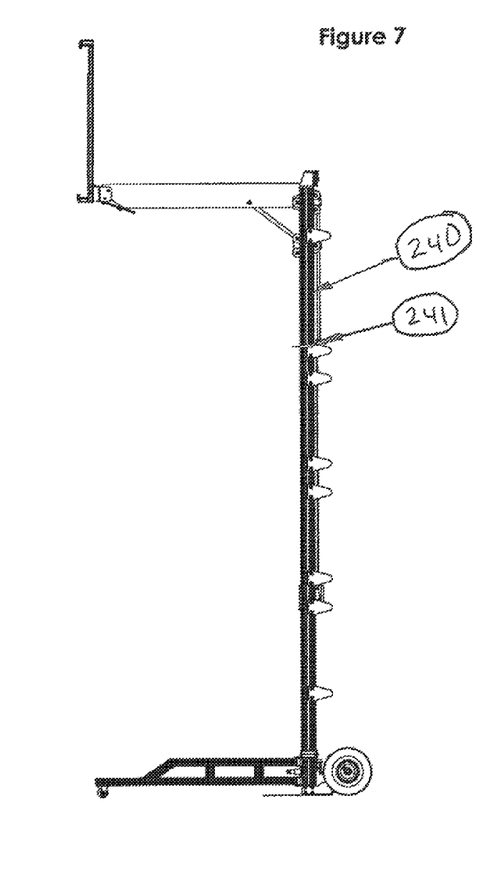
FIG. 7 illustrates an embodiment of the present disclosure, which includes a frame with removable extensions for extending the vertical support to a greater or lesser height.
Figures 8, 9, 10:
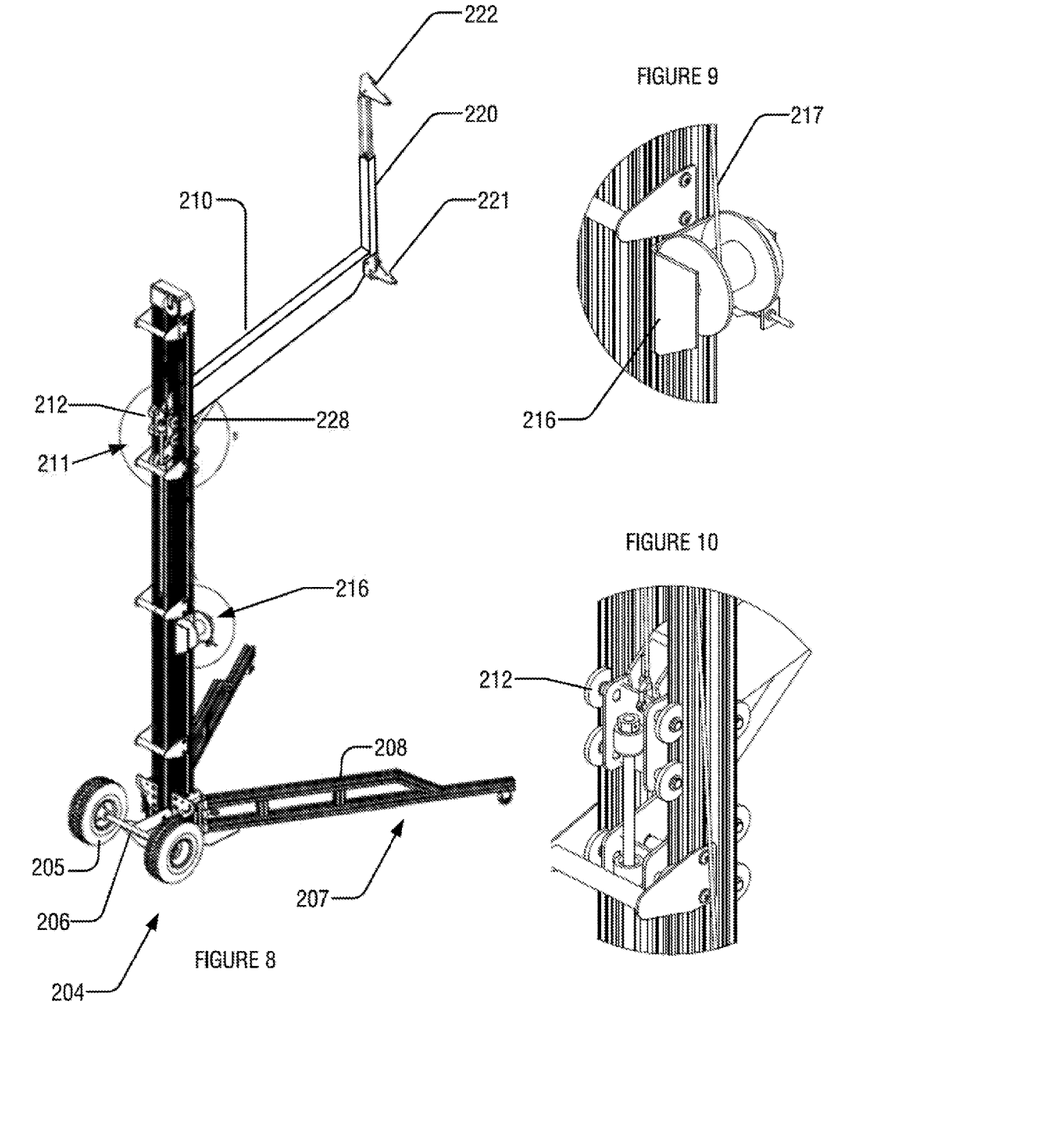
FIG. 8 illustrates an embodiment of the present disclosure in a deployed position.
FIG. 9 illustrates aspects of an exemplary pulley system as employed by embodiments of this disclosure.
FIG. 10 illustrates aspects of an exemplary pulley system as employed by embodiments of this disclosure.
Figures 11, 12:
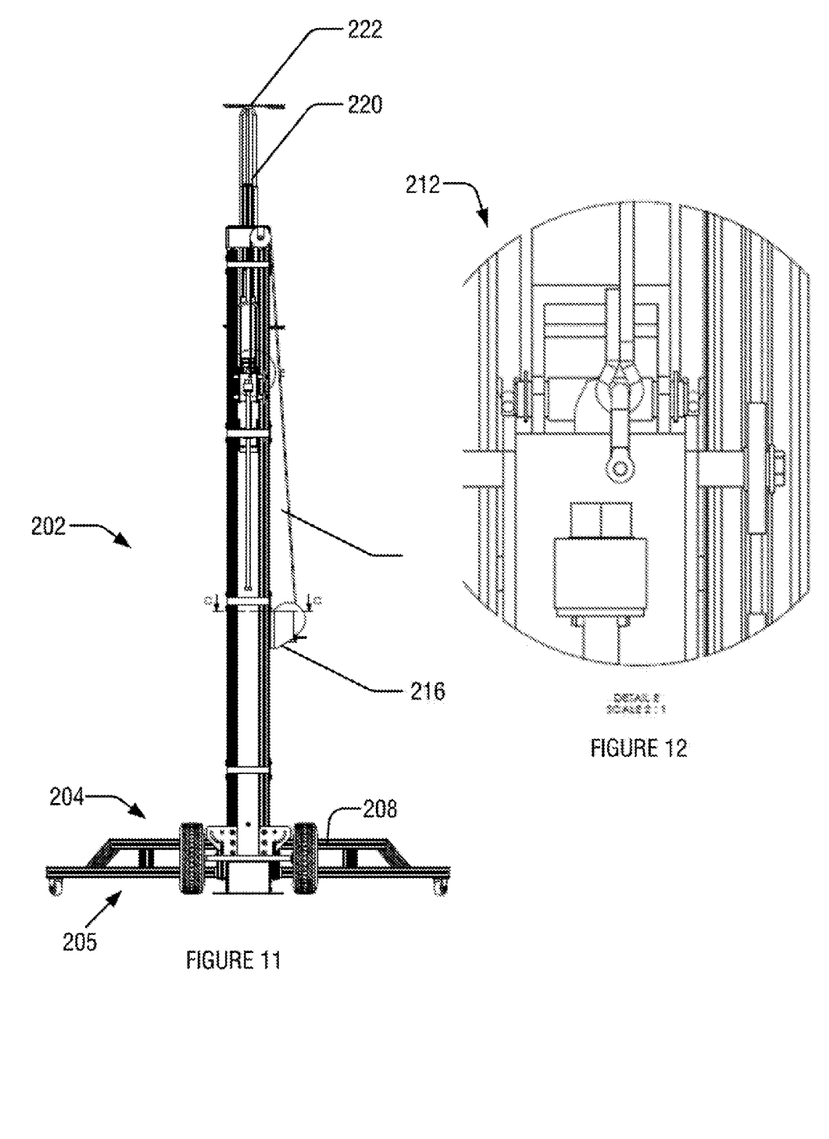
FIG. 11 illustrates an embodiment of the present disclosure from a front on perspective.
FIG. 12 illustrates aspects of an exemplary pulley system as employed by embodiments of this disclosure.

FIG. 7 presents an embodiment wherein extensions can be added or removed to/from the vertical support tracks to access higher mounting locations. Vertical support track extensions 240 in varying length may be bracketed to the existing vertical support tracks by using a simple extension support bracket 241 that secures the two vertical support tracks together using a set of fasteners.

While the present disclosure has been described with respect to preferred and exemplary embodiments, those skilled in the art will readily appreciate that changes and modifications may be made thereto without departing from the spirit and scope of the present disclosure as defined by the appended claims.

The terms and expressions that have been employed are used as terms of description and not of limitation, and there is no intention in the use of such terms and expressions of excluding any equivalents of the features shown and described or portions thereof, but it is recognized that various modifications are possible within the scope of the present disclosure claimed. Thus, it should be understood that although the present disclosure has been specifically disclosed by preferred embodiments and optional features, modification and variation of the concepts herein disclosed may be resorted to by those skilled in the art, and that such modifications and variations are considered to be within the scope of the present disclosure as defined by the appended claims. Thus, additional embodiments are within the scope of the present disclosure and within the following claims.

In general, the terms and phrases used herein have their art-recognized meaning, which can be found by reference to standard texts, journal references, and contexts known to those skilled in the art. The preceding definitions are provided to clarify their specific use in the context of the present disclosure.

All patents and publications mentioned in the specification are indicative of the levels of skill of those skilled in the art to which the present disclosure pertains. All references cited herein are hereby incorporated by reference to the extent that there is no inconsistency with the disclosure of this specification.

Insofar as the description above and the accompanying drawings disclose any additional subject matter that is not within the scope of the claims below, the present disclosure is not dedicated to the public, and the right to file one or more applications to claim is reserved.

The invention claimed is:

1. An apparatus for supporting a display at an elevated position above a floor of a structure, the apparatus comprising:
   a base comprising:
      an elongated rigid base frame;
      at least one wheel configured for supporting the base frame relative to the floor, the wheel rotatable relative to the frame for rolling movement along the floor;
   an elongated horizontal bracing member having a first portion joined to the elongated rigid base frame, the horizontal bracing member having a second portion spaced, from the first portion, the second portion configured to engage the floor in a deployed position, the horizontal bracing member configured to interact with the elongated rigid base frame and the floor for restraining the elongated rigid base frame from tilting toward the second portion in the deployed position;

an elongated rigid vertical support frame supported by the base frame, the vertical support frame having a lower end joined to the base frame in movable relation thereto for being selectably positioned in a lowered position and a raised position, the vertical support frame having an upper end spaced from the lower end, in the raised position the upper end located at a height above the lower end;

a pivoting boom, the pivoting boom having a first end and a second end, wherein the first connects to the vertical support frame at the upper end thereof and the second end spaced from the first end, the second end configured for receiving the display;

a lift pulley system supported by the vertical support frame, the lift pulley system operable for raising the first end of the pivoting boom to a selected vertical position of the pivoting boom relative to the vertical support frame;

the pivoting boom at the first end thereof supported for pivoting movement relative to the vertical support frame, for pivoting movement of the pivoting boom between a first position and a second position;

a pivot connection between the first end of the pivoting boom and the vertical support frame formed by a transitory connection, wherein the transitory connection moves relative to the pulley system connection, whereby movement of the transitory connection relative to the pulley system connection raises or lowers the pivoting boom; and the transitory connection comprising two roller connections, the transitory connection comprising a threaded bar in communication between said two roller connections, the transitory connection configurable by rotating said threaded bar to alter the distance between the two roller connections, wherein rotating said threaded bar to increase the distance between the two roller connections lowers the pivoting boom, wherein rotating said threaded bar to decrease the distance between the two roller connections raises the pivoting boom.

2. The apparatus of claim 1, wherein the pivoting boom in the first position is aligned parallel to the vertical support frame, and wherein the pivoting boom in the second position extends outwards from the vertical support frame.

3. The apparatus of claim 1, wherein the second end of the pivoting boom comprises a mechanical clamp configured for gripping the display.

4. The apparatus of claim 1, wherein the lift-pulley system is actuated by means of a manual ratchet handle.

5. The apparatus of claim 1, wherein the lift-pulley system is actuated by means of a chuck drive.

6. The apparatus of claim 1, wherein the vertical support frame comprises one or more removable connected subparts configurable to alter the length of the vertical support frame.

7. The apparatus of claim 1, wherein the horizontal bracing members rotate between a first position and a second position;

the horizontal bracing members when positioned in the first position are aligned parallel to the direction of the vertical support frame; and the horizontal bracing members when positioned in the second position are aligned relatively perpendicular to the vertical support frame and are splayed outwards.

\* \* \* \* \*